United States Patent
Shu et al.

(10) Patent No.: US 12,355,246 B1
(45) Date of Patent: Jul. 8, 2025

(54) OPTICAL STORAGE SYSTEM FOR COMPENSATING WATER HAMMER EFFECT OF WATER TURBINE AND ITS COOPERATIVE FREQUENCY MODULATION METHOD

(71) Applicant: Kunming University of Science and Technology, Kunming (CN)

(72) Inventors: Hongchun Shu, Kunming (CN); Guangxue Wang, Kunming (CN); Yefu He, Kunming (CN); Yutao Tang, Kunming (CN); Botao Shi, Kunming (CN); Yiming Han, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/026,524

(22) Filed: Jan. 17, 2025

(30) Foreign Application Priority Data

Jul. 25, 2024 (CN) .......................... 202411004183.4

(51) Int. Cl.
*H02J 3/24* (2006.01)
*G05B 13/04* (2006.01)
*H02J 3/38* (2006.01)

(52) U.S. Cl.
CPC .............. *H02J 3/24* (2013.01); *G05B 13/048* (2013.01); *H02J 3/38* (2013.01); *H02J 2300/20* (2020.01); *H02J 2300/24* (2020.01)

(58) Field of Classification Search
CPC .. H02J 3/24; H02J 3/38; H02J 2300/20; H02J 2300/24; G05B 13/048
See application file for complete search history.

(56) References Cited

FOREIGN PATENT DOCUMENTS

CN 116085167 A * 5/2023 .............. F03B 13/00
CN 117200287 A * 12/2023

* cited by examiner

*Primary Examiner* — Charles Cai
(74) *Attorney, Agent, or Firm* — Bayramoglu Law Offices LLC

(57) ABSTRACT

An optical storage system designed to compensate for the water hammer effect in hydropower turbines and its cooperative frequency modulation method are provided. The method involves detecting the water hammer effect and utilizing a pre-established system model integrating a hydropower unit, photovoltaic system, and hybrid energy storage system. Through model predictive control combined with a whale optimization algorithm, the governor parameters of the hydropower unit are optimized. The system then obtains the photovoltaic active power output and the battery's state of charge (SOC) within the hybrid energy storage system. Based on these parameters, a collaborative control strategy for the photovoltaic and hybrid energy storage systems is determined and executed. This strategy enables effective control of the photovoltaic system and/or hybrid energy storage to compensate for reverse power adjustments in the hydropower unit, addressing the water hammer effect and ensuring stable power grid operation.

14 Claims, 15 Drawing Sheets

When the occurrence of the water hammer effect is detected, based on the pre-established system model composed of hydropower units, photovoltaic systems and hybrid energy storage systems, the governor parameters of the hydropower units are optimized by using the whale optimization algorithm based on model predictive control — S10

Obtain the photovoltaic active power output by the photovoltaic system and the state of charge of the batteries in the hybrid energy storage system — S20

Based on the photovoltaic active power and the state of charge of the batteries, determine the target collaborative control strategy for the photovoltaic system and the hybrid energy storage system — S30

Invoke the target collaborative control strategy to control the photovoltaic system and/or the hybrid energy storage system so as to respond to the power reverse adjustment of the hydropower unit — S40

When the occurrence of the water hammer effect is detected, based on the pre-established system model composed of hydropower units, photovoltaic systems and hybrid energy storage systems, the governor parameters of the hydropower units are optimized by using the whale optimization algorithm based on model predictive control  ⎯ S10

Obtain the photovoltaic active power output by the photovoltaic system and the state of charge of the batteries in the hybrid energy storage system  ⎯ S20

Based on the photovoltaic active power and the state of charge of the batteries, determine the target collaborative control strategy for the photovoltaic system and the hybrid energy storage system  ⎯ S30

Invoke the target collaborative control strategy to control the photovoltaic system and/or the hybrid energy storage system so as to respond to the power reverse adjustment of the hydropower unit  ⎯ S40

FIG. 3

OPTICAL STORAGE SYSTEM FOR COMPENSATING WATER HAMMER EFFECT OF WATER TURBINE AND ITS COOPERATIVE FREQUENCY MODULATION METHOD

CROSS-REFERENCE TO THE RELATED APPLICATIONS

This application is based upon and claims priority to Chinese Patent Application No. 202411004183.4, filed on Jul. 25, 2024, the entire contents of which are incorporated herein by reference.

TECHNICAL FIELD

The application relates to the technical field of power system control, in particular to an optical storage system for compensating water hammer effect of water turbine and its cooperative frequency modulation method.

BACKGROUND

When the frequency of the transmission system decreases, due to the water hammer effect between the water flow and the pipeline, the output of the hydroelectric unit decreases briefly and then rises, which is called the power inversion of the hydroelectric unit. This power inversion phenomenon can lead to fluctuations in the frequency of the power grid, which may lead to tripping, power failure, and other phenomena, which have an adverse impact on the stable operation of the power grid.

Therefore, a photovoltaic energy storage system that responds quickly to the system frequency and can be modulated is required to effectively compensate for the power inversion phenomenon caused by the water hammer effect and ensure the stable operation of the power grid.

The above content is only used to assist in understanding the technical solutions of this application, and does not mean that the above content is an admission of existing technology.

SUMMARY

The main purpose of this application is to provide an optical storage system for compensating water hammer effect of water turbine and its cooperative frequency modulation method, which aims to solve the problem of how to avoid the water hammer effect in the hydropower system and cause the unstable operation of the power grid.

In order to achieve the above object, the application provides a method for compensating the water hammer effect of a hydraulic turbine and its coordinated frequency modulation by an optical storage system. The method comprises the following steps:
when the occurrence of the water hammer effect is detected, based on the pre-established system model composed of hydropower units, photovoltaic systems and hybrid energy storage systems, the governor parameters of the hydropower unit are optimized by using the whale optimization algorithm based on model predictive control;
obtain the photovoltaic active power output by the photovoltaic system and the state of charge of the battery in the hybrid energy storage system;
according to the active power of the photovoltaic and the state of charge of the battery, the target cooperative control strategy of the photovoltaic system and the hybrid energy storage is determined;
the target coordinated control strategy is invoked to control the photovoltaic system and/or the hybrid energy storage system in response to the power inversion of the hydroelectric unit;
optionally, the battery state of charge includes a lead-carbon battery state of charge and a super capacitor battery state of charge, and the target coordinated control strategy of the photovoltaic system and hybrid energy storage includes at least one of the following:
determine whether the photovoltaic active power is greater than a preset power threshold, and if so, multiply the load shedding coefficient by the photovoltaic active power to obtain the active power output by the photovoltaic system after the load shedding:

$$d = K_f\left(1 - \frac{\Delta f}{f_0}\right)$$

In the formula, $K_f$ is rated load reducing rate, $\Delta f$ is electric network frequency deviation, $f_0$ is electric network frequency rated value;
determine whether the supercapacitor battery state of charge is in the first battery state of charge interval, and if so, determine whether the lead-carbon battery state of charge is in the second battery state of charge interval. If so, use the product of the sagging coefficient of the lead-carbon battery, the charging and discharging power coefficient and the frequency deviation of the power grid as the charging and discharging power of the lead-carbon battery, and the product of the virtual inertia coefficient of the supercapacitor, the charging and discharging power coefficient and the frequency change rate of the power grid frequency deviation as the charging and discharging power of the supercapacitor;
determine whether the supercapacitor battery state of charge is in the first battery state of charge interval, and if so, determine whether the lead-carbon battery state of charge is in the second battery state of charge interval. If not, the product of the virtual inertia coefficient of the supercapacitor, the charge-discharge power coefficient, and the frequency change rate of the grid frequency deviation is used as the charge-discharge power of the supercapacitor.

Optionally, the discharge power coefficient of the lead-carbon battery and the super capacitor satisfies the following constraints:

$$K_{bess\_d} = \begin{cases} 0, 0 < SOC < SOC_{min} \\ \dfrac{K_{max} P_0 e^{\frac{n(SOC-SOC_{min})}{0.25}}}{K_{max} + P_0\left(e^{\frac{n(SOC-SOC_{min})}{0.25}} - 1\right)}, \text{else} \\ K_{max}, SOC_{max} < SOC < 1 \end{cases}$$

in the formula, $SOC_{min}$ is the lowest SOC alert value, $SOC_{max}$ is the highest SOC alert value, $P_0$ is the initial value, $K_{max}$ is the final value, and n is the adaptation factor.

Optionally, the charging power coefficient of the lead carbon battery and the supercapacitor meets the following constraints:

$$K_{bess\_c} = \begin{cases} K_{max}, 0 < SOC < SOC_{min} \\ \dfrac{K_{max}P_0 e^{\frac{n(SOC_{max}-SOC)}{0.25}}}{K_{max} + P_0\left(e^{\frac{n(SOC_{max}-SOC)}{0.25}} - 1\right)}, \text{else} \\ 0, SOC_{max} < SOC < 1 \end{cases}$$

optionally, the system model includes a hydroelectric unit model, the hydroelectric unit model includes a rotor motion equation of the generator, a generator transfer function, a PID governor transfer function, and a water diversion system transfer function. The rotor motion equation of the generator is as follows:

$$T_a \frac{d\Delta\omega}{dt} = \Delta P_m - \Delta P_e - e_n \Delta\omega$$

the expression of the generator transfer function is:

$$G_{gen}(s) = \frac{\Delta\omega}{\Delta P_m} = \frac{1}{T_a s + e_n}$$

where, $T_n$ is the inertial time constant, $\Delta\omega$ is the rotor angular velocity deviation, $\Delta P_m$ and $\Delta P_e$ are the mechanical power deviation and electromagnetic power deviation of the turbine respectively, $e_n$ is the turbine damping coefficient, and s is the Laplacian operator.

The expression of the transfer function of the PID governor is:

$$G_{gov}(s) = -\frac{\Delta\mu}{\Delta\omega} = \frac{K_D s^2 + K_P s + K_I}{b_p K_I + s} \cdot \frac{1}{T_y s + 1}$$

where, $\Delta\mu$ is the opening deviation of turbine guide vane, $b_p$ is the adjustment coefficient, $K_P$, $K_I$ and $K_D$ are the proportional coefficient, integral coefficient and differential coefficient of the governor respectively, $T_y$ is the time constant of the actuator;

the expression of the transfer function of the water diversion system is:

$$G_w(s) = \frac{\Delta P_m}{\Delta\mu} = \frac{1 - T_w s}{1 + 0.5 T_w s}$$

where, $T_w$ is the inertia time constant of water flow.

Optionally, the system model includes a photovoltaic system model whose transfer function is:

$$G_{pv}(s) = -\frac{\Delta P_{pv}}{\Delta\omega} = \frac{\frac{K_{pv}}{D + Js}}{(1 + T_{dc}s)(1 + T_{ac}s)}$$

where, $K_{PV}$ is the PV active sag coefficient, $T_{dc}$ and $T_{ac}$ are the time constants of DC-DC and DC-AC converters, $\Delta P_{pv}$ is the PV active power deviation, and J is the virtual moment of inertia, D is the virtual damping coefficient.

Optionally, the system model includes a hybrid energy storage system model, wherein the transfer function of the hybrid energy storage system model is:

$$G_{HBESS}(s) = -\frac{\Delta P_{HBESS}}{\Delta\omega} = \frac{K_s K_{sc} s + K_l K_{lc}}{(1 + T_{dc}s)(1 + T_{ac}s)}$$

where, $\Delta P_{HESS}$ is the charge and discharge power of hybrid energy storage system, $K_{lc}$ is the sag coefficient of lead-carbon battery, $K_{sc}$ is the virtual inertia coefficient of super-capacitor, $K_s$ and $K_l$ correspond to the charge/discharge power coefficient of supercapacitor and lead-carbon battery respectively.

Optionally, the system model based on a pre-established hydroelectric unit, a photovoltaic system, and a hybrid energy storage system, prior to the step of using a whale optimization algorithm based on Model Predictive Control to optimize the governor parameters of the hydroelectric unit, further comprising:

obtain the angular velocity deviation value and mechanical power deviation value of the hydraulic turbine unit;

determine the sign positive and negative relationship between the angular velocity deviation value of the turbine and the mechanical power deviation value;

if the sign between the angular velocity deviation value of the turbine and the mechanical power deviation value is the same, it is judged that the water hammer effect occurs in the turbine group.

In addition, to achieve the above object, the present application also provides a computer-readable storage medium on which an optical storage system compensates for the water hammer effect of a turbine and its co-modulation program is stored. The optical storage system compensates for the water hammer effect of a turbine and its co-modulation program. The steps of realizing the optical storage system compensates for the water hammer effect of a turbine and its co-modulation method as described above when the program is executed by the processor.

This application has at least the following beneficial effects:

By adding a photovoltaic system and a hybrid energy storage system to the hydropower system, the power inversion of the hydropower unit when the water hammer effect occurs is compensated, and the corresponding load shedding control strategy is formulated according to the photovoltaic active power output by the photovoltaic system and the state of charge of the battery in the hybrid energy storage system to accelerate the recovery of the system frequency, quickly stabilize the power oscillation, and ensure the stable operation of the power grid and the reliability of power supply;

The water hammer effect of the hydroelectric unit is improved, and the power inversion in the early stage of frequency regulation of the hydroelectric unit is reduced;

The collaborative control of the hybrid energy storage system is realized, which can quickly respond to the system frequency while avoiding overcharging or overdischarging of the battery, which is conducive to prolonging the service life of the battery;

The Whale Optimization Algorithm Based on Model Predictive Control Realizes the Performance Optimization of Hydro-unit Governor.

BRIEF DESCRIPTION OF THE DRAWINGS

FIG. 3 is the flow diagram of the optical storage system compensating the water hammer effect of the turbine and its collaborative frequency modulation method in the first embodiment of this application;

DETAILED DESCRIPTION OF THE EMBODIMENTS

Figure 1:
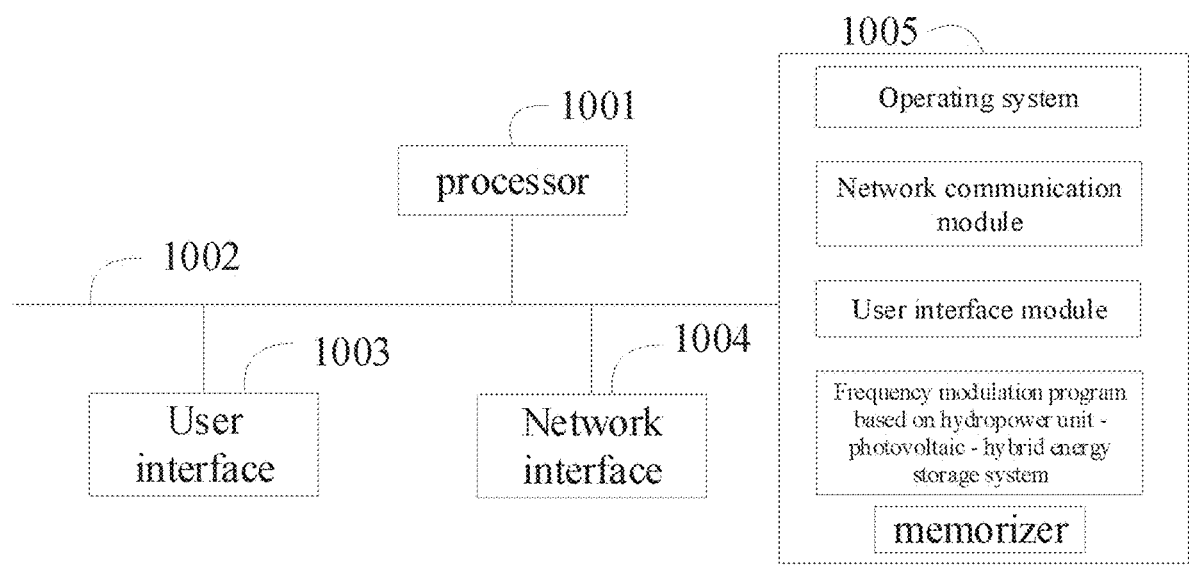
FIG. 1 is a schematic architectural diagram of the hardware operating environment of the hydropower system according to the embodiment of the present application.

In order to better understand the above technical solutions, exemplary embodiments of the present disclosure will be described below in more detail with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to convey the scope of the present disclosure completely to those skilled in the art.

As an implementation solution, FIG. 1 is a schematic architectural diagram of the hardware operating environment of the hydropower system according to the embodiment of the present application.

As shown in FIG. 1, the hydropower system may include: a processor 1001, such as a CPU, a memory 1005, a user interface 1003, a network interface 1004, and a communication bus 1002. Wherein, the communication bus 1002 is used to realize the connection and communication between these components. The user interface 1003 may include a display screen (Display), an input unit such as a keyboard (Keyboard), and an optional user interface 1003 may also include a standard wired interface and a wireless interface. The network interface 1004 may optionally include a standard wired interface and a wireless interface (such as a WI-FI interface). The memory 1005 may be a high-speed RAM memory, or a stable memory (non-volatile memory), such as disk memory. The memory 1005 may also optionally be a storage device independent of the aforementioned processor 1001.

Those skilled in the art will appreciate that the hydropower system architecture shown in FIG. 1 does not constitute a limitation of the hydropower system and may include more or fewer components than shown, or combinations of certain components, or different component arrangements.

As shown in FIG. 1, the memory 1005 as a storage medium can include an operating system, a network communication module, a user interface module, and an optical storage system to compensate for the water hammer effect of the turbine and its co-frequency modulation program. Among them, the operating system is a program that manages and controls the hardware and software resources of the hydropower system.

In the hydropower system shown in FIG. 1, the user interface 1003 is mainly used to connect the end point and perform data communication with the end point; the network interface 1004 is mainly used for the back-end server to perform data communication with the back-end server; the processor 1001 can be used to call the optical storage system stored in the memory 1005 to compensate for the water hammer effect of the turbine and its co-frequency modulation program.

In this embodiment, the hydropower system includes: a memory 1005, a processor 1001, and an optical storage system stored on the memory and running on the processor to compensate for the water turbine water hammer effect and its co-frequency modulation program, wherein:

When the processor 1001 calls the program for compensating the water hammer effect of the hydropower turbine in the light storage system and its collaborative frequency modulation stored in the memory 1005, the following operations are executed:

When the occurrence of the water hammer effect is detected, based on the pre-established system model composed of hydropower units, photovoltaic systems and hybrid energy storage systems, the governor parameters of the hydropower unit are optimized by using the whale optimization algorithm based on model predictive control;

Obtain the photovoltaic active power output by the photovoltaic system and the state of charge of the battery in the hybrid energy storage system;

According to the active power of the photovoltaic and the state of charge of the battery, the target cooperative control strategy of the photovoltaic system and the hybrid energy storage is determined;

The target coordinated control strategy is invoked to control the photovoltaic system and/or the hybrid energy storage system in response to the power inversion of the hydroelectric unit.

When the processor 1001 calls the optical storage system stored in the memory 1005 to compensate for the water hammer effect of the turbine and its cooperative frequency modulation program, the following operations are performed:

(1) Determine whether the photovoltaic active power is greater than a preset power threshold, and if so, multiply the load shedding coefficient by the photovoltaic active power to obtain the active power output by the photovoltaic system after the load shedding:

$$d = K_f\left(1 - \frac{\Delta f}{f_0}\right)$$

In the formula, $K_f$ is rated load reducing rate, $\Delta f$ is electric network frequency deviation, $f_0$ is electric network frequency rated value;

(2) Determine whether the supercapacitor battery state of charge is in the first battery state of charge interval, and if so, determine whether the lead-carbon battery state of charge is in the second battery state of charge interval. If so, use the product of the sagging coefficient of the lead-carbon battery, the charging and discharging power coefficient and the frequency deviation of the power grid as the charging and discharging power of the lead-carbon battery, and the product of the virtual inertia coefficient of the supercapacitor, the charging and discharging power coefficient and the frequency change rate of the power grid frequency deviation as the charging and discharging power of the supercapacitor;

(3) Determine whether the supercapacitor battery state of charge is in the first battery state of charge interval, and if so, determine whether the lead-carbon battery state of charge is in the second battery state of charge interval. If not, the product of the virtual inertia coefficient of the supercapacitor, the charge-discharge power coefficient, and the frequency change rate of the grid frequency deviation is used as the charge-discharge power of the supercapacitor.

When the processor 1001 calls the program for compensating the water hammer effect of the hydropower turbine in the light storage system and its collaborative frequency modulation stored in the memory 1005, it executes the following operations:

Obtain the angular velocity deviation value and mechanical power deviation value of the hydraulic turbine unit;

Determine the sign positive and negative relationship between the angular velocity deviation value of the turbine and the mechanical power deviation value;

If the sign between the angular velocity deviation value of the turbine and the mechanical power deviation value is the same, it is judged that the water hammer effect occurs in the turbine group.

Based on the hardware architecture of the hydropower system of the above-mentioned power system control technology, an embodiment of the optical storage system of the present application for compensating the water hammer effect of a turbine and its coordinated frequency modulation method is proposed.

Figure 2:
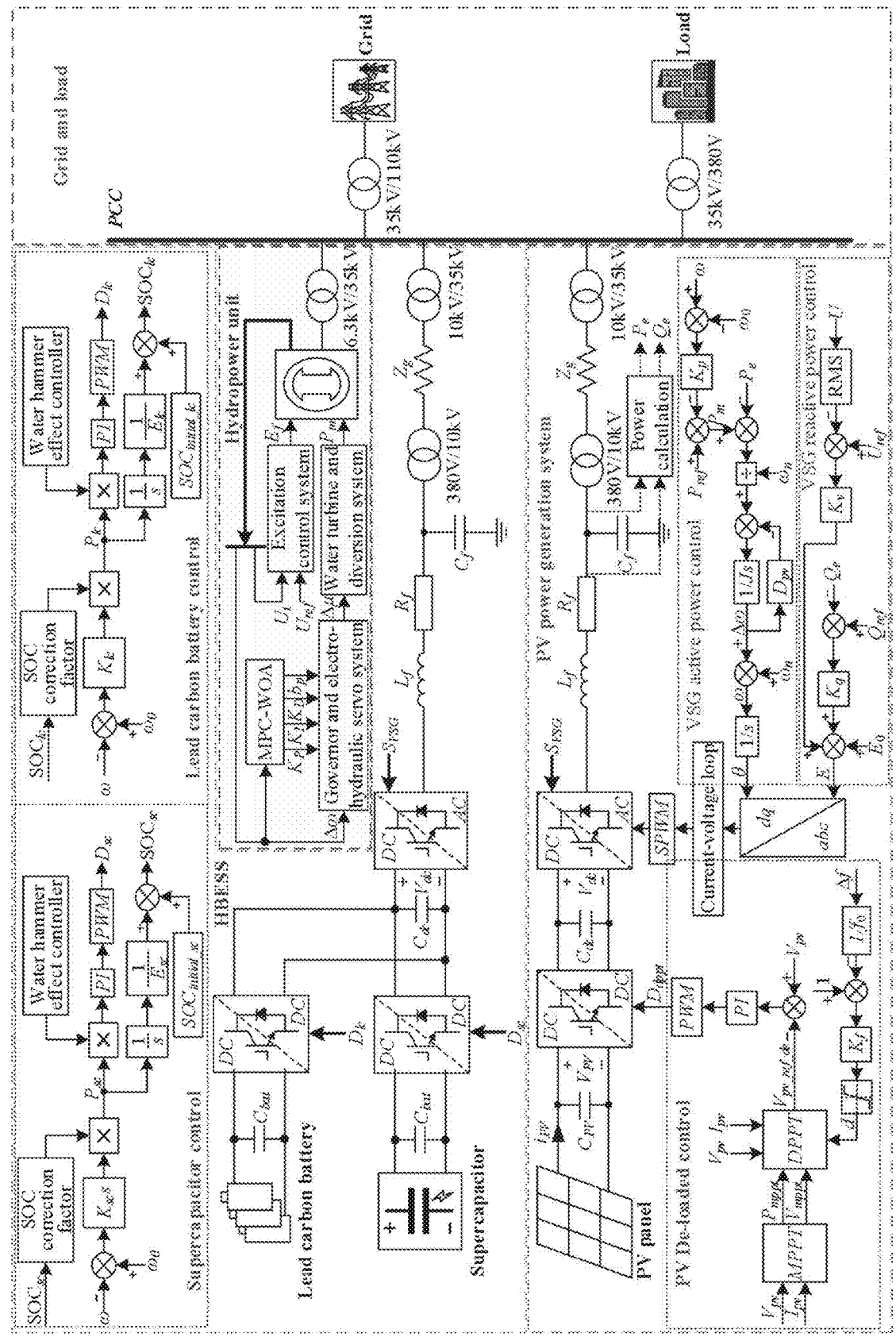
FIG. 2 is a schematic diagram of the control framework of the hydropower system involved in the embodiment of this application.

The first embodiment: In this embodiment, the control framework of the hydropower system is shown in FIG. 2, and the system includes hydropower units, photovoltaic systems, and hybrid energy storage systems. The photovoltaic system is controlled by load-shedding power point tracking (DPPT), and is integrated into the AC bus through DC/DC and DC/AC converters; the hybrid energy storage is composed of lead-carbon batteries and super capacitors, which use droop control and virtual inertial control respectively. The energy is exchanged and stored through a bidirectional DC/DC converter, and then incorporated into the AC bus by DC/AC. The AC side connects the hydropower unit, the load and the power grid.

Referring to FIG. 3, the optical storage system compensates for the water hammer effect of the turbine and its coordinated frequency modulation method includes the following steps:

In step S10, when the water hammer effect is detected, based on the pre-established system model composed of the hydroelectric unit, the photovoltaic system and the hybrid energy storage system, the whale optimization algorithm based on Model Predictive Control is used to optimize the governor parameters of the hydroelectric unit;

In this embodiment, when the water hammer effect is detected in the hydropower system, the governor parameters of the hydropower unit are optimized based on the pre-established system model composed of the hydropower unit, the photovoltaic system and the hybrid energy storage system, combined with the whale optimization algorithm based on the Model Predictive Control.

Optionally, for how to detect the water hammer effect of the hydropower system, a water hammer effect detection controller is used to obtain the water turbine angular velocity deviation value and the mechanical power deviation value of the water turbine group; the sign positive and negative relationship between the water turbine angular velocity deviation value and the mechanical power deviation value is determined; if the sign between the water turbine angular velocity deviation value and the mechanical power deviation value is the same, the water hammer effect detection controller determines that the water turbine has the water hammer effect.

Figure 4:
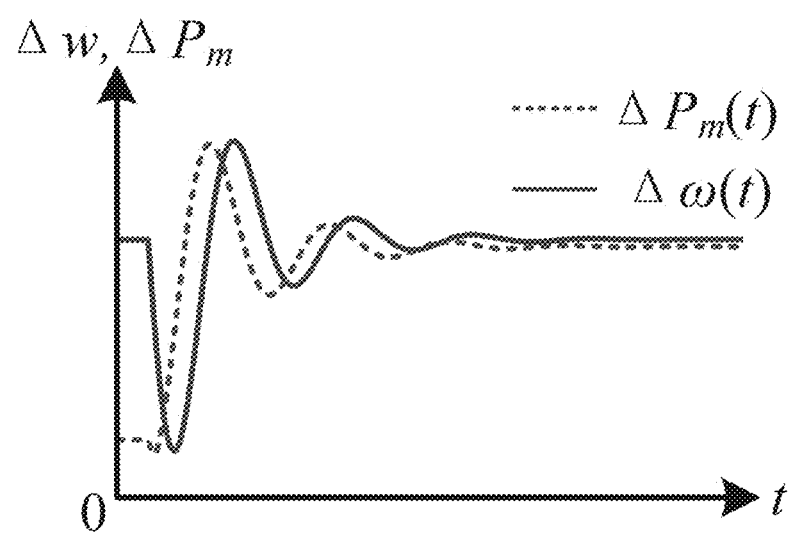
FIG. 4 is a schematic diagram of the water hammer effect of the turbine involved in the embodiment of this application.

Specifically, the sensor monitors the frequency f of the grid and the active power Pm output of the turbine in real time; Referring to the diagram of the water hammer effect of the turbine shown in FIG. 4, the water hammer effect is identified and the switching state of the power compensation element is judged by comparing the symbols of the turbine angular velocity deviation $\Delta\omega$ and the mechanical power deviation $\Delta P_m$. When $\Delta\omega$ and $\Delta P_m$ symbols are the same, the response of turbine and water diversion system is opposite to the required control, and there is water hammer effect. When $\Delta\omega$ and $\Delta P_m$ symbols are opposite, there is no water hammer effect. The water hammer effect and the switching state of the controller are shown in Table 1 below:

TABLE 1

Water hammer effect and controller switch state

| $\Delta\omega$ | $\Delta P_m$ | water hammer effect | controller switching state |
|---|---|---|---|
| + | + | exist | open |
| + | − | inexistent | close |
| − | + | inexistent | close |
| − | − | exist | open |

In this embodiment, the pre-established system model composed of hydropower units, photovoltaic systems and hybrid energy storage systems includes a hydropower unit model, a photovoltaic system model and a hybrid energy storage system model.

Figure 5:
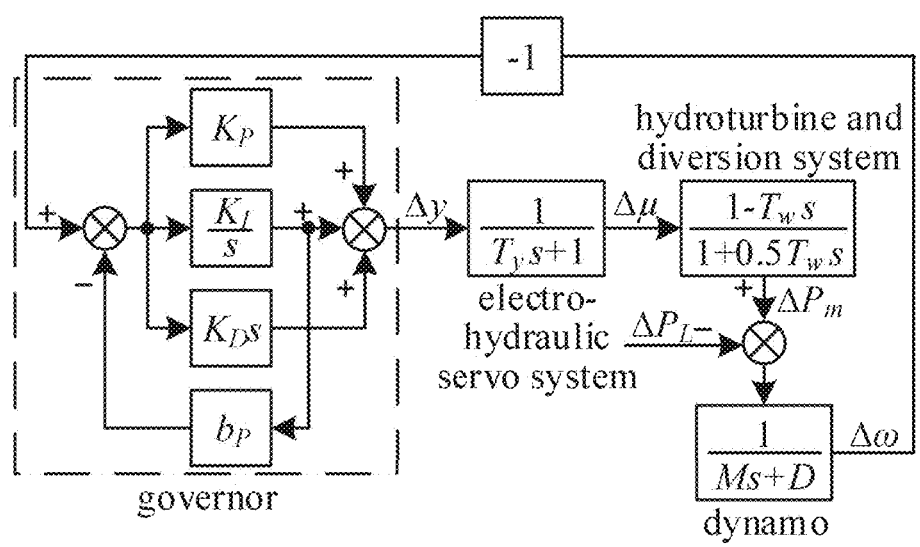
FIG. 5 is a schematic diagram of the basic frequency response process of grid-connected operation of the hydropower unit model involved in the embodiment of this application.

Optionally, in this embodiment, the basic process of the frequency response of the hydropower unit model during grid-connected operation is shown in FIG. 5. The mathematical model of the hydropower unit consists of three modules: the speed regulation system, the turbine and the diversion system, and the generator. Among them, the generator rotor motion equation is as follows:

$$T_a \frac{d\Delta\omega}{dt} = \Delta P_m - \Delta P_e - e_n \Delta\omega$$

ignoring the network loss and voltage change, the electromagnetic power change is approximately the load active power change, and the expression of the generator transfer function is:

$$G_{gen}(s) = \frac{\Delta\omega}{\Delta P_m} = \frac{1}{T_a s + e_n}$$

where, $T_n$ is the inertial time constant, $\Delta\omega$ is the rotor angular velocity deviation, $\Delta P_m$ and $\Delta P_e$ are the mechanical power deviation and electromagnetic power deviation of the turbine respectively, $e_n$ is the turbine damping coefficient, and s is the Laplacian operator.

The expression of the transfer function of the PID governor is:

$$G_{gov}(s) = -\frac{\Delta\mu}{\Delta\omega} = \frac{K_D s^2 + K_P s + K_I}{b_p K_I + s} \frac{1}{T_y s + 1}$$

where, $\Delta\mu$ is the opening deviation of turbine guide vane, $b_p$ is the adjustment coefficient, $K_P$, KI and $K_D$ are the proportional coefficient, integral coefficient and differential coefficient of the governor respectively, $T_y$ is the time constant of the actuator;

in the dynamic process of the power system, only the water hammer effect caused by the inertia of the water flow is considered, and the expression of the transfer function of the water diversion system is:

$$G_w(s) = \frac{\Delta P_m}{\Delta\mu} = \frac{1 - T_w s}{1 + 0.5 T_w s}$$

where, $T_w$ is the inertia time constant of water flow.

Optionally, Tw is generally 0.5 s to 4 s when fully loaded.

Optionally, in this embodiment, the transfer function of the PV system model is:

$$G_{pv}(s) = -\frac{\Delta P_{pv}}{\Delta\omega} = \frac{\frac{K_{pv}}{D + Js}}{(1 + T_{dc}s)(1 + T_{ac}s)}$$

where, $K_{pv}$ is the PV active sag coefficient, $T_{dc}$ and $T_{ac}$ are the time constants of DC-DC and DC-AC converters, $\Delta P_{pv}$ is the PV active power deviation, and J is the virtual moment of inertia, D is the virtual damping coefficient.

Optionally, in this embodiment, the transfer function of the hybrid energy storage system model is:

$$G_{HBESS}(s) = -\frac{\Delta P_{HBESS}}{\Delta\omega} = \frac{K_s K_{sc} s + K_l K_{lc}}{(1 + T_{dc}s)(1 + T_{ac}s)}$$

where, $\Delta P_{HESS}$ is the charge and discharge power of hybrid energy storage system, $K_{lc}$ is the sag coefficient of lead-carbon battery, $K_{sc}$ is the virtual inertia coefficient of supercapacitor, $K_s$ and $K_l$ correspond to the charge/discharge power coefficient of supercapacitor and lead-carbon battery respectively.

In this embodiment, based on the above-mentioned hydroelectric units, photovoltaic systems, and hybrid energy storage systems, Whale Optimization Algorithm (WOA) based on Model Predictive Control (MPC), Optimize the governor parameters of hydropower units.

Specifically, in this embodiment, based on the aforementioned hydropower units, photovoltaic systems, and hybrid energy storage systems, the Whale Optimization Algorithm (WOA) is used in conjunction with Model Predictive Control (MPC) to optimize the governor parameters of the hydropower units.

Figure 6:
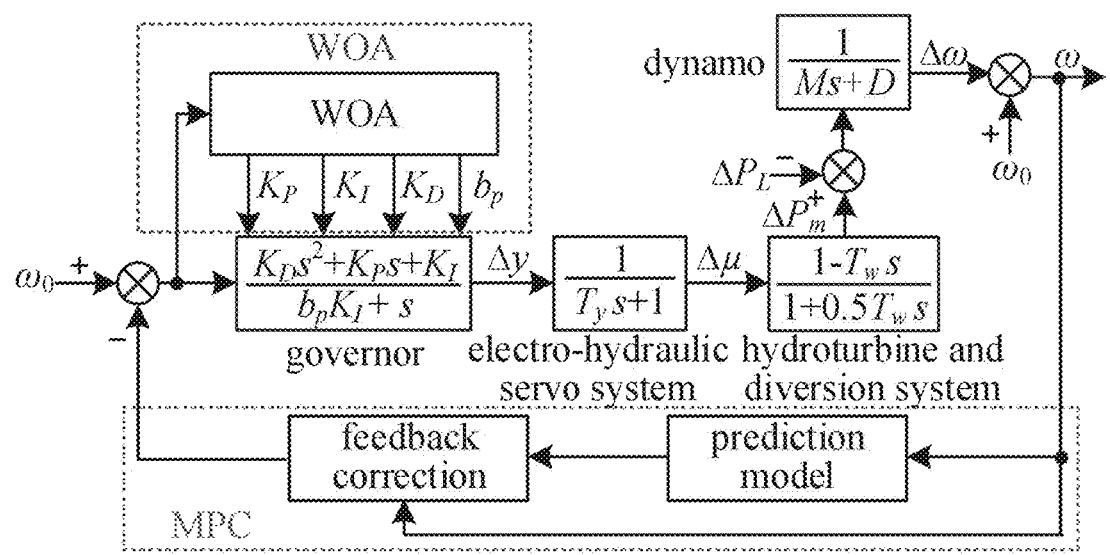
FIG. 6 is the schematic diagram of MPC-WOA based optimization of hydropower unit parameter control involved in the embodiment of this application.

Specifically, a prediction model is introduced into the feedback loop of the PID governor to achieve a better control effect. The MPC solves the prediction model based on the system information at the current moment for feedback correction, and the WOA optimizes the PID controller to improve the desired output and adjustment speed. The control of hydropower unit parameter optimization based on MPC-WOA is shown in FIG. 6.

In step S20, obtain the photovoltaic active power output by the photovoltaic system and the state of charge of the battery in the hybrid energy storage system;

In step S30, according to the active power of the photovoltaic and the state of charge of the battery, the target cooperative control strategy of the photovoltaic system and the hybrid energy storage is determined;

In step S40, the target coordinated control strategy is invoked to control the photovoltaic system and/or the hybrid energy storage system in response to the power inversion of the hydroelectric unit.

In this embodiment, after the optimization of the governor parameters of the hydroelectric unit is completed, the photovoltaic system and the hybrid energy storage system are used to participate in the frequency regulation of the power grid, and the target coordinated control strategy of the photovoltaic system and the hybrid energy storage is determined according to the active power of the photovoltaic and the state of charge of the battery.

Specifically, the water hammer effect detection controller is added to the photovoltaic system and the hybrid energy storage system, and only when the water hammer effect of the hydroelectric unit is detected, the photovoltaic system and the hybrid energy storage system participate in the frequency modulation.

It should be noted that whether a photovoltaic system participates in system frequency regulation depends on the current ambient temperature and irradiance. Based on the comprehensive consideration of photovoltaic performance and power grid demand, it is necessary to ensure that photovoltaics can be connected to the grid and have spare capacity to participate in system frequency regulation to ensure the stable output of the photovoltaic system.

The hybrid energy storage system includes lead-carbon batteries and supercapacitors. Supercapacitors have a fast charge-discharge rate and can respond quickly when the water hammer effect occurs, and cut out the system at the lowest point of power ($dP_m/dt=0$); while lead-carbon batteries have a slower start-up time, but can provide longer-lasting power support, ensuring the stability of the grid frequency and suppressing power fluctuations. Supercapacitors provide fast response and power support in the early stage of frequency modulation, lead-carbon batteries provide continuous power compensation, and supercapacitors and lead-carbon batteries work together to accelerate the recovery of the system frequency and quickly stabilize power oscillations, thus ensuring the stable operation of the grid and the reliability of power supply.

Optionally, the minimum power $P_{pv\_min}$ of the photovoltaic system participating in frequency modulation is set to 70% of the maximum power output point of the photovoltaic system under rated working conditions. The frequency modulation strategy of the photovoltaic system is as follows:

(1) Judging whether the photovoltaic active power is greater than the preset power threshold, if so, multiplying the load-reducing coefficient by the photovoltaic active power, so as to obtain the active power output by the photovoltaic system after load-reducing, wherein the load-reducing coefficient expression is as follows:

$$d = K_f\left(1 - \frac{\Delta f}{f_0}\right)$$

Figure 7:
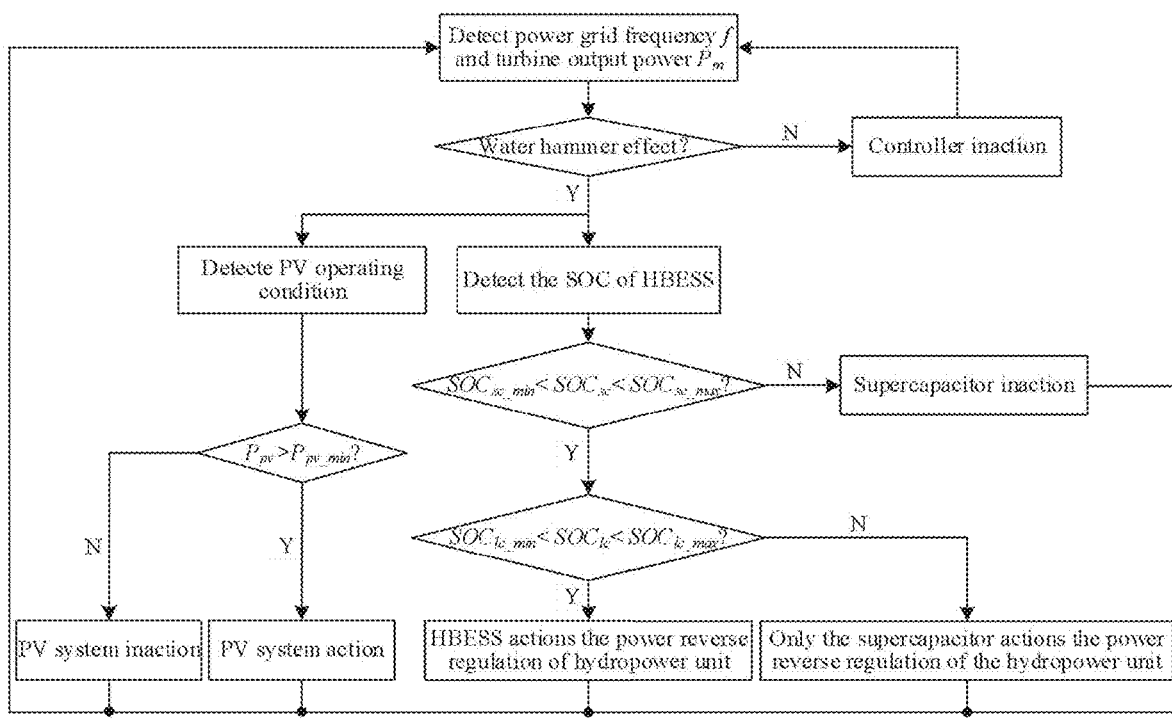
FIG. 7 is the flow chart of the hybrid energy storage system to compensate the water hammer effect of the hydropower unit involved in the embodiment of this application.

In the formula, $K_f$ is rated load reducing rate, $\Delta f$ is electric network frequency deviation, $f_0$ is electric network frequency rated value;

Optionally, referring to the flowchart of the hybrid energy storage system compensating for the water hammer effect of the hydroelectric unit shown in FIG. 7, the participation of the hybrid energy storage system in the frequency modulation depends on the state of charge of the supercapacitor battery and the state of charge of the lead-carbon battery in the system, and adjusts the charge-discharge power coefficient of the battery according to the value of the battery state of charge to avoid overcharging or overdischarging the battery. Through the sag coefficient and the virtual inertia coefficient, the output of the lead-carbon battery and the supercapacitor, as well as the response strength and speed to the transient power shortage, optimize the system stability, and balance supply and demand in a short period of time.

It specifically includes the following two strategies:

(2) Determine whether the supercapacitor battery state of charge is in the first battery state of charge interval, and if so, determine whether the lead-carbon battery state of charge is in the second battery state of charge interval. If so, use the product of the sagging coefficient of the lead-carbon battery, the charging and discharging power coefficient and the frequency deviation of the power grid as the charging and discharging power of the lead-carbon battery, and the product of the virtual inertia coefficient of the supercapacitor, the charging and discharging power coefficient and the frequency change rate of the power grid frequency deviation as the charging and discharging power of the supercapacitor;

(3) Determine whether the supercapacitor battery state of charge is in the first battery state of charge interval, and if so, determine whether the lead-carbon battery state of charge is in the second battery state of charge interval. If not, the product of the virtual inertia coefficient of the supercapacitor, the charge-discharge power coefficient, and the frequency change rate of the grid frequency deviation is used as the charge-discharge power of the supercapacitor.

Optionally, the discharge power coefficient of the lead-carbon battery and the super capacitor satisfies the following constraints:

$$K_{bess\_d} = \begin{cases} 0, 0 < SOC < SOC_{min} \\ \dfrac{K_{max}P_0 e^{\frac{n(SOC-SOC_{min})}{0.25}}}{K_{max} + P_0\left(e^{\frac{n(SOC-SOC_{min})}{0.25}} - 1\right)}, \text{else} \\ K_{max}, SOC_{max} < SOC < 1 \end{cases}$$

In the formula, $SOC_{min}$ is the lowest SOC alert value, $SOC_{max}$ is the highest SOC alert value, P0 is the initial value, $K_{max}$ is the final value, and n is the adaptation factor.

Optionally, the charging power coefficient of the lead carbon battery and the supercapacitor meets the following constraints:

$$K_{bess\_c} = \begin{cases} K_{max}, 0 < SOC < SOC_{min} \\ \dfrac{K_{max}P_0 e^{\frac{n(SOC_{max}-SOC)}{0.25}}}{K_{max} + P_0\left(e^{\frac{n(SOC_{max}-SOC)}{0.25}} - 1\right)}, \text{else} \\ 0, SOC_{max} < SOC < 1 \end{cases}$$

When the system frequency changes, the active power provided by lead-carbon batteries and supercapacitors is:

$$\begin{cases} \Delta P_{lc} = K_l K_{lc} \Delta f = K_l K_{lc}(f - f_0) \\ \Delta P_{sc} = K_s K_{sc} \dfrac{d\Delta f}{dt} \end{cases}$$

Where, $K_{lc}$ is the sag coefficient of the lead-carbon battery, $\Delta P_{lc}$ is the charge and discharge power of the lead-carbon battery, $K_{sc}$ is the virtual inertia coefficient of the supercapacitor, $\Delta P_{sc}$ is the charge and discharge power of the supercapacitor, and f is the actual frequency value of the power grid.

Optionally, set the charging state of the supercapacitor as $SOC_{sc}$, then the first battery charge state interval is:

$SOC_{sc\_min} < SOC_{sc} < SOC_{sc\_max}$

Where, $SOC_{sc\_min}$ is the minimum allowable power of the supercapacitor, and $SOC_{sc\_max}$ is the maximum allowable power of the supercapacitor.

Optionally, set the charging state of the lead-carbon battery as $SOC_{lc}$, then the charging state interval of the second battery is:

$SOC_{lc\_min} < SOC_{lc} < SOC_{lc\_max}$

Where, $SOC_{lc\_min}$ is the allowable minimum state of charge for the lead-carbon battery, and $SOC_{lc\_max}$ is the allowable maximum state of charge for the lead-carbon battery.

In this embodiment, the target coordinated control strategy of the photovoltaic system and the hybrid energy storage system determined according to the output photovoltaic active power of the photovoltaic system and the state of charge of the battery in the hybrid energy storage system is invoked to control the photovoltaic system and/or the charge and discharge power adjustment of the hybrid energy storage system, and then compensate for the instantaneous power fluctuation caused by the water hammer effect of the hydroelectric unit through the power fluctuation of the photovoltaic system and the hybrid energy storage system.

It can be understood that the above strategies can be selected as long as their judgment conditions are met. For example, if the photovoltaic active power is less than or equal to the preset power threshold, strategy (1) will not be selected. If it is judged that the state of charge of the supercapacitor battery is not within the state of charge interval of the battery, strategies (2) and (3) will not be selected.

In the technical solution provided by this embodiment, by adding a photovoltaic system and a hybrid energy storage system to the hydropower system, the power compensation when the water hammer effect occurs in the hydropower unit is compensated. And corresponding load shedding control strategies are formulated according to the photovoltaic active power output by the photovoltaic system and the state of charge of the batteries in the hybrid energy storage system, so as to accelerate the recovery of the system frequency, quickly suppress power oscillations, and thus ensure the stable operation of the power grid and the reliability of power supply.

The second embodiment: Based on any of the above embodiments, in this embodiment, the effectiveness of the proposed photovoltaic storage system compensation turbine water hammer effect and its co-frequency modulation method is verified by simulation:

(1) Comparison of Parameter Optimization of Hydroelectric Units

Suppose the installed capacity of the hydropower unit is 20 MW, the base voltage is 6.3 kV, and it is boosted to 35 kV and integrated into the main grid. The three-phase load is set to 10 MW. The rated frequency of the system is 50 Hz, and the simulation results are in per-unit values with a power base value of 50 MW. The parameters of the unoptimized hydropower unit are taken as follows: $K_p=1.06$, $K_i=0.8$, $K_{ID}=0$, $b_p=0$, $T_y=0.2$, $T_w=1$, $T_a=8$, $e_n=1.5$. The population number N of the WOA algorithm is 50, the maximum number of iterations $t_{max}=10$, and the sampling frequency of MPC is set to 0.1 s. The system simulation time is set to 100 s, and a load disturbance of 0.1 p.u. is added at 5 s.

Figure 8:
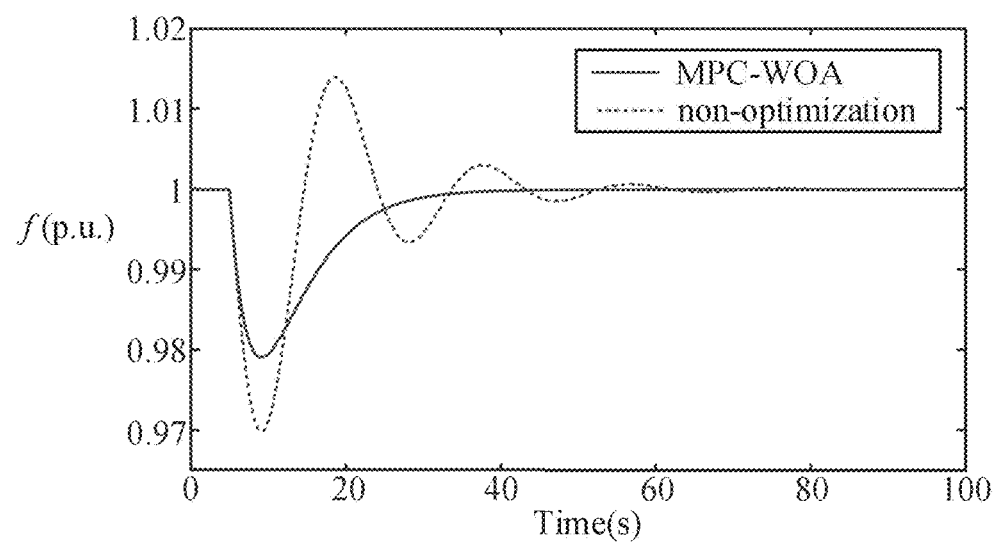
FIG. 8 is the comparison diagram of system frequency before and after optimizing hydropower unit parameters involved in this application embodiment.
Figure 9:
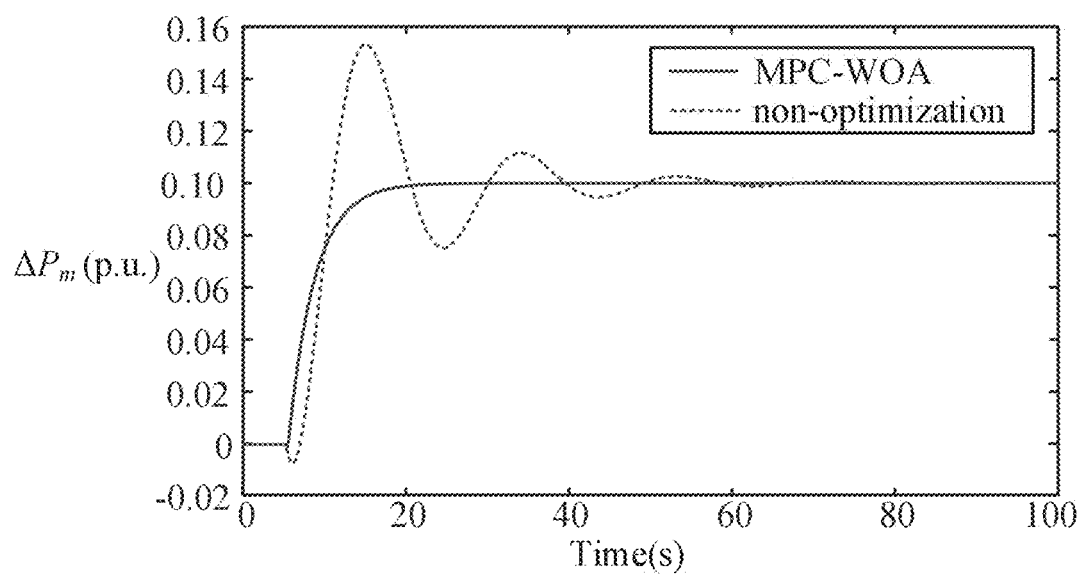
FIG. 9 is the comparison diagram of turbine mechanical power deviation before and after optimizing hydropower unit parameters involved in this application embodiment.

The MPC-WOA optimization method is added to the speed regulation system of the hydropower unit. The deviation curves of the system frequency and the mechanical power of the turbine before and after optimizing the parameters of the hydropower unit are shown in FIG. 8 and FIG. 9. It can be seen that when the system load increases, the adjustment direction of the turbine power is opposite to the expected direction in the early stage of frequency modulation. When the traditional PID control is used for the speed regulator of the hydropower unit, due to the improper setting of the parameters of the speed regulator, the mechanical power of the turbine and the system frequency oscillate violently and decay slowly. After the parameters of the speed regulator of the hydropower unit are optimized, the mechanical power of the turbine quickly stabilizes and the frequency quickly tends to be stable.

The comparison of the adjustment time and overshoot of the system frequency and the deviation of the mechanical power of the turbine before and after the optimization of the parameters of the hydropower unit governor is shown in Table 2 and Table 3 below. When the deviation is less than 0.1%, it is considered that the system has entered a steady state. After the parameters of the hydropower unit governor are optimized, there is no overshoot for f and $\Delta P_m$. The $t_s$ of f is increased by 39.69%, and the $t_s$ of $\Delta P_m$ is increased by 68.46%. The reverse adjustment of the active power of the turbine is reduced by 87.18%. After the optimization of the parameters of the hydropower unit, the primary frequency modulation performance is greatly improved, and the reverse adjustment of the turbine power caused by the water hammer effect is effectively suppressed.

TABLE 2

Comparison of system frequency adjustment time and overshoot before and after parameter optimization of hydroelectric units

|  | MPC-WOA | non-optimization |
|---|---|---|
| drop value | 0.9790 | 0.9697 |
| $t_s$ (s) | 30.128 | 49.953 |
| σ (%) | 0 | 1.41 |

TABLE 3

Comparison of turbine mechanical power adjustment time and overshoot before and after parameter optimization of hydroelectric units

|  | MPC-WOA | non-optimization |
|---|---|---|
| drop value($10^{-2}$) | −0.0937 | −0.7309 |
| $t_s$ (s) | 20.311 | 64.404 |
| σ (%) | 0 | 53.0 |

(2) Validation of Water Hammer Effect Compensation Method for Photovoltaic Energy Storage System The parameter values of the photovoltaic storage system are as follows: $K_f=0.9$, $K_{PV}=2.85$, $K_D=15$, $J=3$, $K_{lc}=1/6.457$, $K_{sc}=0.0043$. The system simulation time is set to 100 s, and a load disturbance of 0.1 p.u. is added at 5 s. In order to prevent the overcharging and overdischarging of the energy storage battery, the parameter values of the lead-carbon battery and the supercapacitor in this paper are shown in Table 4 as follows:

TABLE 4

Parameters of lead-carbon batteries and supercapacitors

|  | lead carbon battery | supercapacitor |
|---|---|---|
| $SOC_{max}$ | 0.8 | 0.9 |
| $SOC_{min}$ | 0.2 | 0.1 |
| $SOC_{initial}$ | 0.7 | 0.7 |
| $P_0$ | 0.01 | 0.1 |
| $K_{max}$ | 100 | 100 |
| N | 15 | 100 |

Figure 10:
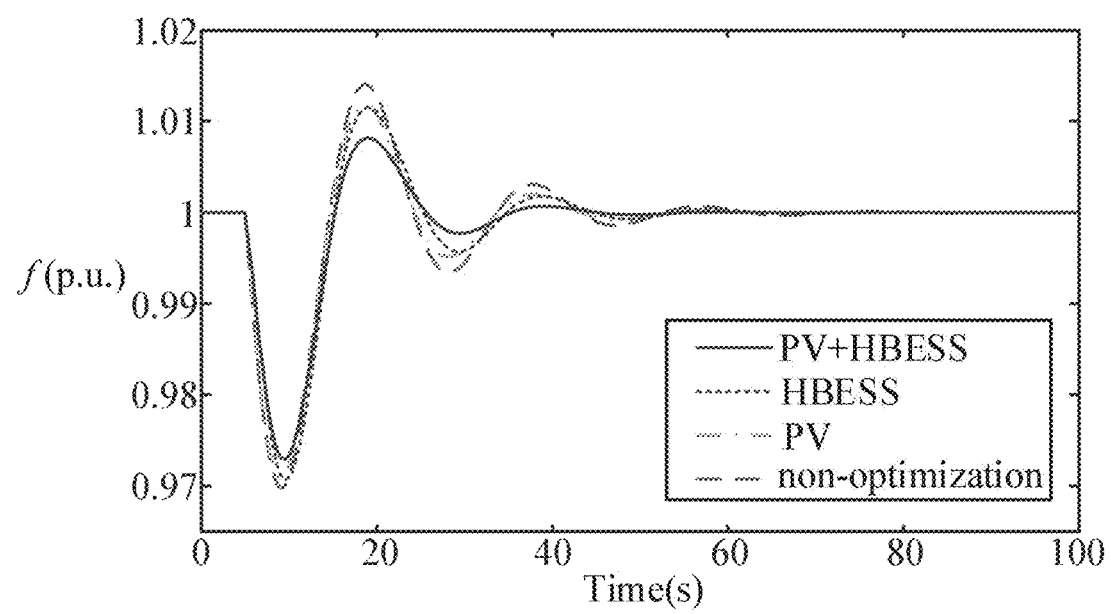
FIG. 10 is a comparison diagram of system frequency changes of different compensation strategies involved in this application embodiment.
Figure 11:
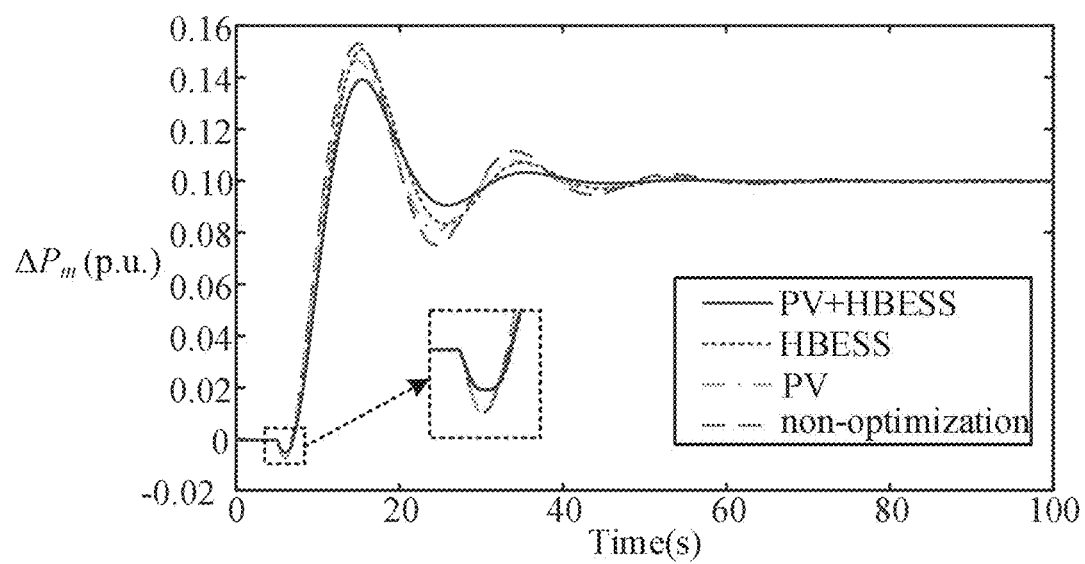
FIG. 11 is a comparison diagram of turbine mechanical power deviation of different compensation strategies involved in the embodiments of this application.

Different strategies compensate for the water hammer effect of hydroelectric units. The system frequency and turbine mechanical power deviation curves are shown in FIG. 10 and FIG. 11. It can be seen that when the system load increases, lead-carbon batteries and supercapacitors cooperate with the load shedding photovoltaic system to effectively slow down the system frequency fluctuation, and the increase of the available power decreases the system oscillation amplitude. Supercapacitors respond quickly when the water hammer effect occurs, improving the lowest point of the hydroelectric unit power inversion. When the photovoltaic does not meet the output conditions, only the energy storage system participates in the system frequency modulation.

Figure 12:
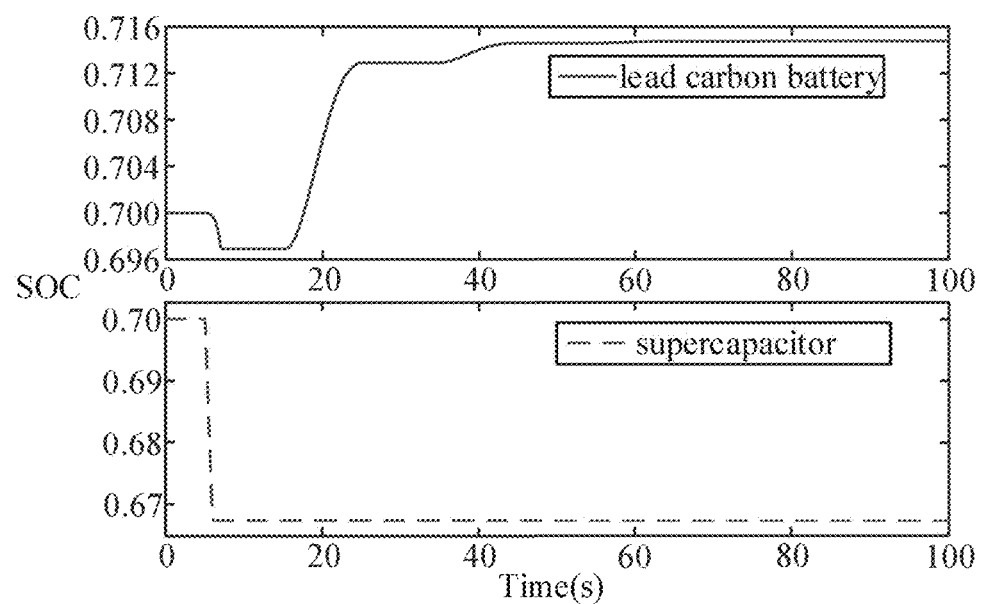
FIG. 12 shows the SOC changes of lead-carbon batteries and supercapacitors involved in the embodiments of this application.
Figure 13:
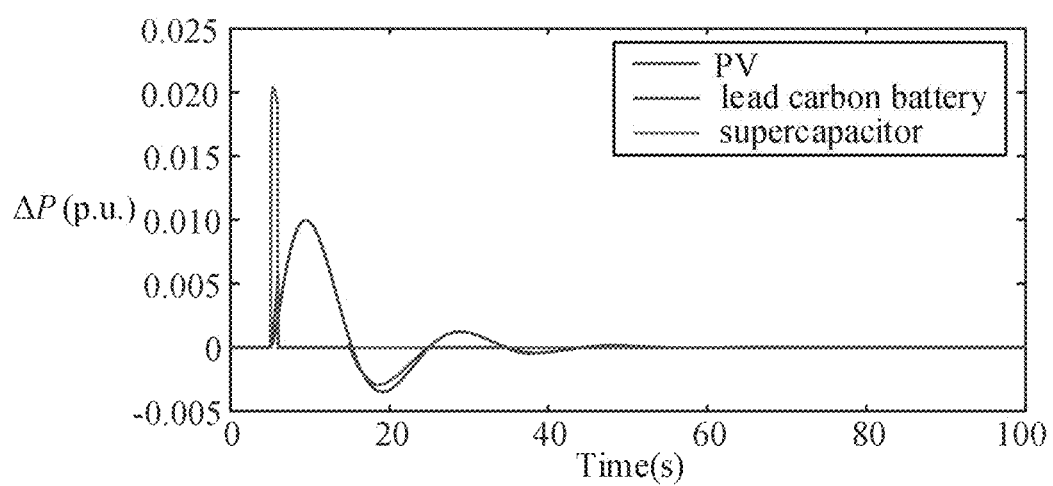
FIG. 13 shows the active power deviation diagram of photovoltaic, lead-carbon battery and supercapacitor involved in the embodiment of this application.

FIG. 12 shows the changes in the state of charge (SOC) of the lead-carbon battery and the supercapacitor. Corresponding to the battery output situation, the charging and discharging rates of the lead-carbon battery and the supercapacitor are constrained by the battery SOC. FIG. 13 shows the output situations of the photovoltaic, the lead-carbon battery and the supercapacitor. During the stage of the positive water hammer effect, the photovoltaic, the lead-carbon battery and the supercapacitor respond rapidly and increase the active power output. When the mechanical power of the hydropower unit is higher than the steady-state value, the photovoltaic operates below the rated load shedding rate, and the lead-carbon battery is in a charging state.

The comparison of the adjustment time and overshoot of the system frequency and turbine mechanical power deviation of different compensation strategies is shown in Table 5. Table 6. It can be seen that the lead-carbon battery and super capacitor cooperate with the load-shedding photovoltaic system, compared with the system that only calls the photovoltaic spare capacity, the system frequency adjustment time is increased by 19.41%, the overshoot is reduced by 0.37%, the hydraulic turbine mechanical power adjustment time is increased by 27.72%, and the overshoot is reduced by 7.2%. Compared with the uncompensated system, the system frequency adjustment time is increased by 33.31%, and the overshoot is reduced by 0.59%: the hydraulic turbine mechanical power adjustment time is increased by 40.15%, and the overshoot is reduced by 13.7%. Supercapacitors have high energy density, can charge and discharge quickly, and can provide fast response and power support in the early stage of frequency modulation. Lead-carbon batteries provide continuous power compensation. Supercapacitors and lead-carbon batteries work together to accelerate the recovery of system frequency and quickly stabilize power oscillation. Lead-carbon batteries and supercapacitors cooperate with load shedding photovoltaic systems to compensate significantly, greatly improving the power reversal caused by the water hammer effect of hydroelectric units.

TABLE 5

Comparison of system frequency adjustment time and overshoot before and after adding load shedding photovoltaic-energy storage system

|  | PV-HBESS | HBESS | PV | non-compensation |
|---|---|---|---|---|
| drop value | 0.9728 | 0.9706 | 0.9709 | 0.9697 |
| $t_s$ (s) | 33.316 | 42.270 | 41.339 | 49.953 |
| σ (%) | 0.82 | 1.15 | 1.19 | 1.41 |

TABLE 6

Comparison of adjustment time and overshoot of turbine mechanical power change rate before and after increasing load-shedding photovoltaic-energy storage system

|  | PV-HBESS | HBESS | PV | non-compensation |
|---|---|---|---|---|
| drop value ($10^{-2}$) | −0.4634 | −0.4675 | −0.7262 | −0.7309 |
| $t_s$ (s) | 40.153 | 56.718 | 55.552 | 64.404 |
| σ (%) | 39.3 | 51.4 | 46.5 | 53.0 |

Figure 14:
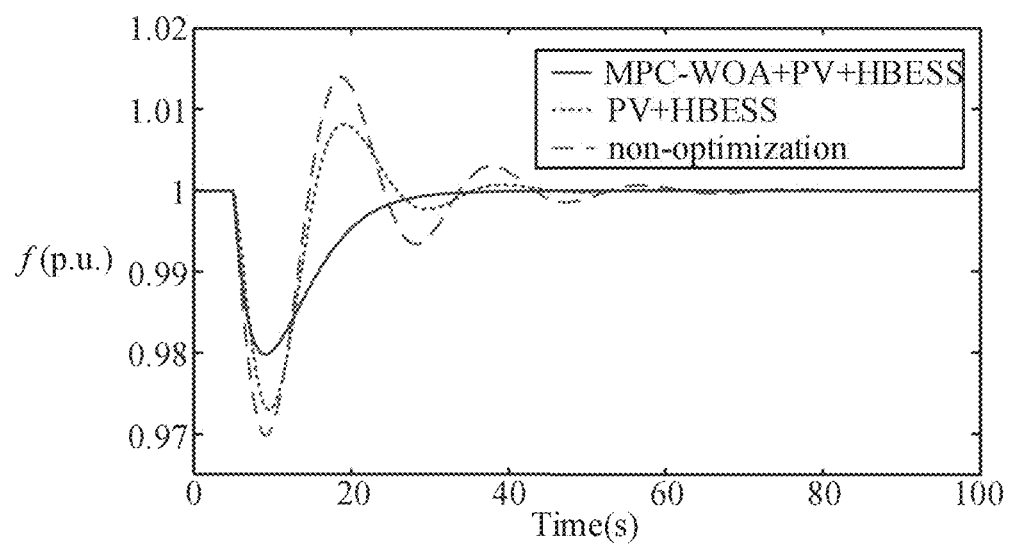
FIG. 14 shows the system frequency comparison diagram before and after the hydropower unit parameter optimization and photovoltaic energy storage system compensation involved in the embodiment of this application.
Figure 15:
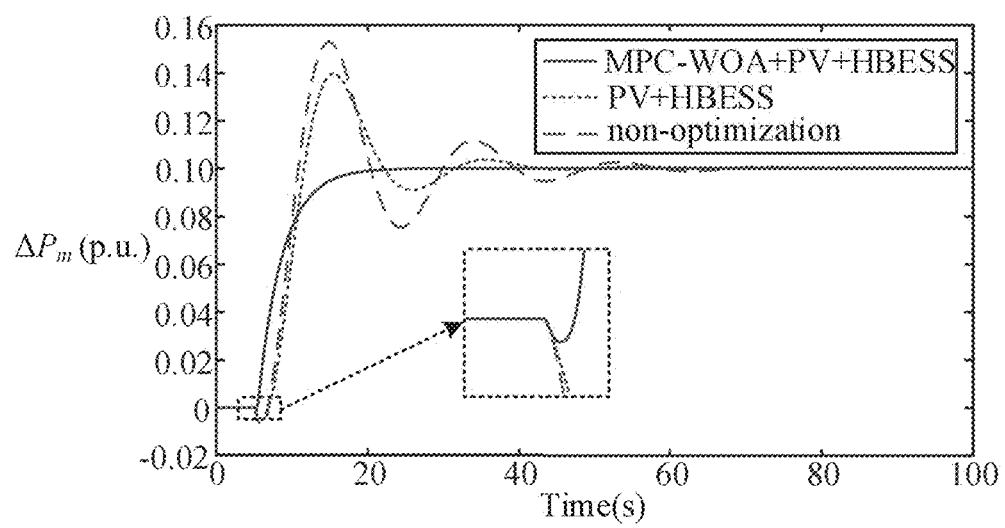
FIG. 15 is the comparison diagram of the mechanical power change rate of the turbine before and after the parameter optimization of the hydropower unit and the compensation of the photovoltaic energy storage system.

Collaborative control verification of parameter optimization of hydropower units combined with compensation of photovoltaic energy storage system The MPC-WOA algorithm optimizes the parameters of the governor of the hydroelectric unit, and cooperates with the photovoltaic and hybrid energy storage systems to compensate for the power inversion caused by the water hammer effect of the hydroelectric unit, and optimizes the performance of the primary frequency modulation of the system. The system frequency and turbine mechanical power deviation curves before and after the collaborative optimization control are shown in FIGS. 14 and 15. It can be seen that when the system load increases, the optimization of the governor parameters of the hydroelectric unit and the photovoltaic and hybrid energy storage systems participate in the primary frequency modulation of the system, which can greatly improve the system frequency fluctuation, reduce the frequency drop amplitude, and reduce the power inversion caused by the water hammer effect of the hydroelectric.

The comparison of the adjustment time and overshoot of the change rate of the system frequency and the mechanical power of the turbine before and after the optimization of the hydropower unit parameters combined with the compensation of the photovoltaic energy storage system is shown in Table 7 and Table 8. It can be seen that when the water hammer effect occurs in the system, after the optimization of the hydropower unit parameters combined with the compensation of the photovoltaic energy storage system, the adjustment time of the system frequency is increased by 45.58% compared with the uncompensated system and by 18.41% compared with the compensation of the photovoltaic energy storage system. The reverse adjustment of the power of the hydropower unit is reduced by 56.81% compared with the uncompensated system and by 30.73% compared with the compensation of the photovoltaic energy storage system. Moreover, there is no overshoot in the deviation of the system frequency and the active power of the hydropower unit. This indicates that the MPC-WOA algorithm proposed in this paper for optimizing the parameters of the hydropower unit governor, combined with the method of using the photovoltaic energy storage system to compensate for the water hammer effect of the hydropower unit, has a remarkable adjustment effect, greatly improves the primary frequency modulation performance, and effectively suppresses the reverse adjustment of the turbine power caused by the water hammer effect.

TABLE 7

Comparison of system frequency adjustment time and overshoot before and after different compensation and optimization methods

|  | MPC-WOA-PV-HBESS | PV-HBESS | non-compensation |
|---|---|---|---|
| drop value | 0.9797 | 0.9728 | 0.9697 |
| $t_s$ (s) | 27.183 | 33.316 | 49.953 |
| σ (%) | 0 | 0.82 | 1.41 |

TABLE 8

Comparison of adjustment time and overshoot of turbine mechanical power rate of change before and after different compensation and optimization methods

|  | MPC-WOA-PV-HBESS | PV-HBESS | non-compensation |
|---|---|---|---|
| drop value ($10^{-2}$) | −0.0685 | −0.4634 | −0.7309 |
| $t_s$ (s) | 27.815 | 40.153 | 64.404 |
| σ (%) | 0 | 39.3 | 53.0 |

In addition, those of ordinary skill in the art can understand that all or part of the process of realizing the method of the above embodiments can be completed by instructing the relevant hardware through a computer program. The computer program includes program instructions, and the computer program can be stored in a storage medium, which is a computer-readable storage medium. The program instructions are executed by at least one processor in the water and electricity system to implement the flow steps of the above-described method embodiments.

Therefore, the present application also provides a computer-readable storage medium, the computer-readable storage medium storing an optical storage system compensating for the water hammer effect of the turbine and its co-frequency modulation program, and the optical storage system compensating for the water hammer effect of the turbine and its co-frequency modulation program. When executed by the processor, the optical storage system compensating for the water hammer effect of the turbine and the various steps completed by the co-frequency modulation method are realized as described in the above embodiment.

Wherein, the computer-readable storage medium may be a U disk, a removable hard disk, a read-only memory (ROM), magnetic disk or optical disk and other computer-readable storage medium capable of storing program code.

It should be noted that since the storage medium provided by the embodiments of the present application is the storage medium used to implement the method of the embodiments of the present application, those skilled in the art can understand the specific structure and deformation of the storage medium based on the method described in the embodiments of the present application, and therefore will not be repeated here. All storage media used by the methods of the embodiments of the present application belong to the scope of protection intended by the present application.

Those skilled in the art should understand that the embodiments of the present application can be provided as methods, systems or computer program products. Therefore, the present application can take the form of a complete hardware embodiment, a complete software embodiment or an embodiment combining software and hardware aspects. Moreover, the present application can take the form of a computer program product implemented on one or more computer-usable storage media (including but not limited to disk storage, CD-ROM, optical storage, etc.) that contain computer-usable program code.

This application is described with reference to the flowcharts and/or block diagrams of the methods, devices (systems) and computer program products according to the embodiments of this application. It should be understood that each process and/or block in the flowcharts and/or block diagrams, as well as the combination of the processes and/or blocks in the flowcharts and/or block diagrams, can be implemented by computer program instructions. These computer program instructions can be provided to the processors of general-purpose computers, special-purpose computers, embedded processors or other programmable data processing devices to generate a machine, so that the instructions executed by the processors of the computer or other programmable data processing devices generate a device for implementing the functions specified in a flowchart, one or more processes and/or a block diagram, one or more blocks.

These computer program instructions can also be stored in a computer-readable memory that can guide a computer or other programmable data processing equipment to work in a specific manner, so that the instructions stored in the computer-readable memory generate an article of manufacture including instruction means, and the instruction means implements the functions specified in a flowchart, one or more processes and/or a block diagram, one or more blocks.

These computer program instructions can also be loaded onto a computer or other programmable data processing equipment, so that a series of operational steps are executed on the computer or other programmable equipment to generate a computer-implemented process, and thus the instructions executed on the computer or other programmable equipment provide steps for implementing the functions specified in a flowchart, one or more processes and/or a block diagram, one or more blocks.

It should be noted that in the claims, no reference signs located between parentheses should be constructed to limit the claim. The word "comprising" does not exclude the presence of a component or step not listed in the claim. The words "a" or "an" located before a component do not exclude the presence of a plurality of such components. This application may be implemented by means of hardware comprising several different components and by means of a suitably programmed computer. In unit claims enumerating such devices, several of these devices may be embodied by the same hardware item. The use of the words first, second, third, etc. does not indicate any order. These words may be interpreted as names.

Although the preferred embodiments of this application have been described, additional changes and modifications may be made to these embodiments by those skilled in the art once the basic inventive concepts are known. Therefore, the appended claims are intended to be construed to include the preferred embodiments and all changes and modifications falling within the scope of this application.

Obviously, those skilled in the art can make various modifications and modifications to this application without departing from the spirit and scope of this application. Thus, provided that these modifications and variations of this application fall within the scope of the claims of this application and their equivalents, this application is also intended to include such modifications and modifications.

What is claimed is:

1. A method for compensating a water hammer effect of a turbine by a photovoltaic storage system and performing a collaborative frequency modulation of the turbine, applied to a hydropower system, wherein the hydropower system comprises a hydropower unit, a photovoltaic system and a hybrid energy storage system, and the method comprises the following steps:
    when an occurrence of the water hammer effect is detected, based on a pre-established system model composed of the hydropower unit, the photovoltaic system and the hybrid energy storage system, optimizing governor parameters of the hydropower unit by using a whale optimization algorithm based on model predictive control;
    obtaining a photovoltaic active power output by the photovoltaic system and a state of charge (SOC) of a battery in the hybrid energy storage system;
    according to the photovoltaic active power and the state of charge of the battery, determining a target coordinated control strategy of the photovoltaic system and the hybrid energy storage system; and
    invoking the target coordinated control strategy to control the photovoltaic system and/or the hybrid energy storage system in response to a power inversion of the hydropower unit;
    wherein the state of charge of the battery comprises a lead-carbon battery state of charge and a super capacitor battery state of charge, and the target coordinated control strategy of the photovoltaic system and hybrid energy storage system comprises at least one of the following:
    determine whether the photovoltaic active power is greater than a preset power threshold, and in response to being so, multiply a load shedding coefficient by the photovoltaic active power to obtain an active power output by the photovoltaic system after the load shedding:

$$d = K_f\left(1 - \frac{\Delta f}{f_0}\right)$$

wherein $K_f$ is a rated load reducing rate, $\Delta f$ is an electric network frequency deviation, and $f_0$ is an electric network frequency rated value;

determine whether the super capacitor battery state of charge is in a first battery state of charge interval, and in response to being so, determine whether the lead-carbon battery state of charge is in a second battery state of charge interval, and in response to being so, use a product of a sagging coefficient of a lead-carbon battery, a charging and discharging power coefficient and a frequency deviation of a power grid as a charging and discharging power of the lead-carbon battery, and a product of a virtual inertia coefficient of a super capacitor, the charging and discharging power coefficient and a frequency change rate of the frequency deviation of the power grid as a charging and discharging power of the super capacitor; and determine whether the super capacitor battery state of charge is in the first battery state of charge interval, and in response to being so, determine whether the lead-carbon battery state of charge is in the second battery state of charge interval, and in response to being not, use the product of the virtual inertia coefficient of the super capacitor, the charge-discharge power coefficient, and the frequency change rate of the frequency deviation of the power grid as the charge-discharge power of the super capacitor.

2. The method according to claim 1, wherein a discharge power coefficient of the lead-carbon battery and the super capacitor satisfies the following constraints:

$$K_{bess\_d} = \begin{cases} 0, & 0 < SOC < SOC_{min} \\ \dfrac{K_{max}P_0 e^{\frac{n(SOC-SOC_{min})}{0.25}}}{K_{max} + P_0\left(e^{\frac{n(SOC-SOC_{min})}{0.25}} - 1\right)}, & \text{else} \\ K_{max}, & SOC_{max} < SOC < 1 \end{cases}$$

wherein $SOC_{min}$ is a lowest SOC alert value, $SOC_{max}$ is a highest SOC alert value, $P_0$ is an initial value, $K_{max}$ is a final value, and n is an adaptation factor.

3. The method according to claim 2, wherein charging power coefficients of the lead-carbon battery and the super capacitor satisfy the following constraints:

$$K_{bess\_c} = \begin{cases} K_{max}, & 0 < SOC < SOC_{min} \\ \dfrac{K_{max}P_0 e^{\frac{n(SOC_{max}-SOC)}{0.25}}}{K_{max} + P_0\left(e^{\frac{n(SOC_{max}-SOC)}{0.25}} - 1\right)}, & \text{else} \\ 0, & SOC_{max} < SOC < 1 \end{cases}.$$

4. The method according to claim 1, wherein the pre-established system model comprises a hydropower unit model, and the hydropower unit model comprises a rotor motion equation of a generator, a generator transfer function, a transfer function of a proportional integral differential (PID) governor, and a transfer function of a water diversion system, wherein the rotor motion equation of the generator is as follows:

$$T_a \frac{d\Delta\omega}{dt} = \Delta P_m - \Delta P_e - e_n \Delta\omega;$$

an expression of the generator transfer function is:

$$G_{gen}(s) = \frac{\Delta\omega}{\Delta P_m} = \frac{1}{T_a s + e_n};$$

wherein $T_n$ is an inertia time constant, $\Delta\omega$ is a rotor angular velocity deviation, $\Delta P_m$ and $\Delta P_e$ are a mechanical power deviation and an electromagnetic power deviation of the turbine respectively, $e_n$ is a damping coefficient of the turbine, and s is a Laplacian operator;

an expression of the transfer function of the PID governor is:

$$G_{gov}(s) = -\frac{\Delta\mu}{\Delta\omega} = \frac{K_D s^2 + K_P s + K_I}{b_b K_I + s} \frac{1}{T_y s + 1}$$

wherein $\Delta\mu$ is an opening deviation of a turbine guide vane, $b_p$ is an adjustment coefficient, $K_p$, $K_I$ and $K_D$ are a proportional coefficient, an integral coefficient and a differential coefficient of the PID governor respectively, $T_y$ is a time constant of an actuator; and an expression of the transfer function of the water diversion system is:

$$G_w(s) = \frac{\Delta P_m}{\Delta\mu} = i\frac{1 - T_w s}{1 + 0.5 T_w s}$$

wherein $T_w$ is an inertia time constant of a water flow.

5. The method according to claim 1, wherein the pre-established system model comprises a photovoltaic system model, and a transfer function of the photovoltaic system model is:

$$G_{pv}(s) = -\frac{\Delta P_{pv}}{\Delta\omega} = \frac{\dfrac{K_{pv}}{D + Js}}{(1 + T_{dc}s)(1 + T_{ac}s)}$$

wherein $K_{PV}$ is a photovoltaic (PV) active sag coefficient, $T_{dc}$ and $T_{ac}$ are the time constants of DC-DC and DC-AC converters, $\Delta P_{pv}$ is a PV active power deviation, and J is a virtual moment of inertia, D is a virtual damping coefficient.

6. The method according to claim 1, wherein the pre-established system model comprises a hybrid energy storage system model, wherein a transfer function of the hybrid energy storage system model is:

$$C_{HBESS}(s) = -\frac{\Delta P_{HBESS}}{\Delta\omega} = \frac{K_s K_{sc} s + K_l K_{lc}}{(1 + T_{dc}s)(1 + T_{ac}s)}$$

wherein $\Delta P_{HESS}$ is charge and discharge power of the hybrid energy storage system, $K_{lc}$ is a sag coefficient of the lead-carbon battery, $K_{sc}$ is a virtual inertia coefficient of the super capacitor, $K_s$ and $K_l$ correspond to charge/discharge power coefficient of the super capacitor and the lead-carbon battery respectively.

7. The method according to claim 1, wherein before the step of optimizing the governor parameters of the hydropower unit by using the whale optimization algorithm based on the model predictive control based on the pre-established system model composed of the hydropower unit, the photovoltaic system and the hybrid energy storage system, the method further comprises:
   obtaining an angular velocity deviation value and a mechanical power deviation value of the hydraulic turbine unit;
   determining a sign positive and negative relationship between the angular velocity deviation value of the turbine and the mechanical power deviation value; and
   in response to the sign between the angular velocity deviation value of the turbine and the mechanical power deviation value being same, determining that the water hammer effect occurs in the hydraulic turbine unit.

8. A non-transient computer-readable storage medium, wherein the computer-readable storage medium stores a program for compensating a water hammer effect of a turbine by a photovoltaic storage system and performing a collaborative frequency modulation of the turbine, wherein when the program for compensating the water hammer effect of the turbine by the photovoltaic storage system and performing the collaborative frequency modulation of the turbine is executed by a processor, steps of the method for compensating the water hammer effect of the turbine by the photovoltaic storage system and performing the collaborative frequency modulation of the turbine according to claim 1 are implemented.

9. The non-transient computer-readable storage medium according to claim 8, wherein a discharge power coefficient of the lead-carbon battery and the super capacitor satisfies the following constraints:

$$K_{bess\_d} = \begin{cases} 0, & 0 < SOC < SOC_{min} \\ \dfrac{K_{max}P_0 e^{\frac{n(SOC-SOC_{min})}{0.25}}}{K_{max}+P_0\left(e^{\frac{n(SOC-SOC_{min})}{0.25}}-1\right)}, & \text{else} \\ K_{max}, & SOC_{max} < SOC < 1 \end{cases}$$

wherein $SOC_{min}$ is a lowest SOC alert value, $SOC_{max}$ is a highest SOC alert value, $P_0$ is an initial value, $K_{max}$ is a final value, and n is an adaptation factor.

10. The non-transient computer-readable storage medium according to claim 9, wherein charging power coefficients of the lead-carbon battery and the super capacitor satisfy the following constraints:

$$K_{bess\_c} = \begin{cases} K_{max}, & 0 < SOC < SOC_{min} \\ \dfrac{K_{max}P_0 e^{\frac{n(SOC_{max}-SOC)}{0.25}}}{K_{max}+P_0\left(e^{\frac{n(SOC_{max}-SOC)}{0.25}}-1\right)}, & \text{else} \\ 0, & SOC_{max} < SOC < 1 \end{cases}.$$

11. The non-transient computer-readable storage medium according to claim 8, wherein the pre-established system model comprises a hydropower unit model, and the hydropower unit model comprises a rotor motion equation of a generator, a generator transfer function, a transfer function of a proportional integral differential (PID) governor, and a transfer function of a water diversion system, wherein the rotor motion equation of the generator is as follows:

$$T_a \frac{d\Delta\omega}{dt} = \Delta P_m - \Delta P_e - e_n \Delta\omega;$$

an expression of the generator transfer function is:

$$G_{gen}(s) = \frac{\Delta\omega}{\Delta P_m} = \frac{1}{T_a s + e_n};$$

wherein $T_n$ is an inertia time constant, $\Delta\omega$ is a rotor angular velocity deviation, $\Delta P_m$ and $\Delta P_e$ are a mechanical power deviation and an electromagnetic power deviation of the turbine respectively, $e_n$ is a damping coefficient of the turbine, and s is a Laplacian operator;

an expression of the transfer function of the PID governor is:

$$G_{gov}(s) = -\frac{\Delta\mu}{\Delta\omega} = \frac{K_D s^2 + K_P s + K_I}{b_p K_I + s} \frac{1}{T_y s + 1}$$

wherein $\Delta\mu$ is an opening deviation of a turbine guide vane, $b_p$ is an adjustment coefficient, $K_p$, $K_I$ and $K_D$ are a proportional coefficient, an integral coefficient and a differential coefficient of the PID governor respectively, $T_y$ is a time constant of an actuator; and an expression of the transfer function of the water diversion system is:

$$G_w(s) = \frac{\Delta P_m}{\Delta\mu} = \frac{1 - T_w s}{1 + 0.5 T_w s}$$

wherein $T_w$ is an inertia time constant of a water flow.

12. The non-transient computer-readable storage medium according to claim 8, wherein the pre-established system model comprises a photovoltaic system model, and a transfer function of the photovoltaic system model is:

$$G_{pv}(s) = -\frac{\Delta P_{pv}}{\Delta\omega} = \frac{\dfrac{K_{pv}}{D+Js}}{(1+T_{dc}s)(1+T_{ac}s)}$$

wherein $K_{PV}$ is a photovoltaic (PV) active sag coefficient, $T_{dc}$ and $T_{ac}$ are the time constants of DC-DC and DC-AC converters, $\Delta P_{pv}$ is a PV active power deviation, and J is a virtual moment of inertia, D is a virtual damping coefficient.

13. The non-transient computer-readable storage medium according to claim 8, wherein the pre-established system model comprises a hybrid energy storage system model, wherein a transfer function of the hybrid energy storage system model is:

$$G_{HBESS}(s) = -\frac{\Delta P_{HBESS}}{\Delta\omega} = \frac{K_s K_{sc} s + K_l K_{lc}}{(1+T_{dc}s)(1+T_{ac}s)}$$

wherein $\Delta P_{HESS}$ is charge and discharge power of the hybrid energy storage system, $K_{lc}$ is a sag coefficient of the lead-carbon battery, $K_{sc}$ is a virtual inertia coefficient of the super capacitor, $K_s$ and $K_l$ correspond to charge/discharge power coefficient of the super capacitor and the lead-carbon battery respectively.

14. The non-transient computer-readable storage medium according to claim 8, wherein before the step of optimizing the governor parameters of the hydropower unit by using the whale optimization algorithm based on the model predictive control based on the pre-established system model composed of the hydropower unit, the photovoltaic system and the hybrid energy storage system, the method further comprises:

obtaining an angular velocity deviation value and a mechanical power deviation value of the hydraulic turbine unit;

determining a sign positive and negative relationship between the angular velocity deviation value of the turbine and the mechanical power deviation value; and if the sign between the angular velocity deviation value of the turbine and the mechanical power deviation value is same, determining that the water hammer effect occurs in the hydraulic turbine unit.

\* \* \* \* \*